(12) United States Patent
Wüllrich et al.

(10) Patent No.: US 11,214,134 B2
(45) Date of Patent: Jan. 4, 2022

(54) LINKAGE FLAP ARRANGEMENT AND CONVERTIBLE VEHICLE HAVING A LINKAGE FLAP ARRANGEMENT

(71) Applicant: Webasto SE, Stockdorf (DE)

(72) Inventors: Heinrich Wüllrich, Stockdorf (DE); Franz Haberl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 68 days.

(21) Appl. No.: 16/727,112

(22) Filed: Dec. 26, 2019

(65) Prior Publication Data

US 2020/0215891 A1     Jul. 9, 2020

(30) Foreign Application Priority Data

Jan. 9, 2019 (DE) .................... 10 2019 100 435.7

(51) Int. Cl.
  *B60J 7/20* (2006.01)
  *B60J 7/12* (2006.01)
(52) U.S. Cl.
  CPC ............. *B60J 7/203* (2013.01); *B60J 7/1265* (2013.01)
(58) Field of Classification Search
  CPC .................. B60J 7/203; B60J 7/1265
  USPC ....................... 296/136.05, 136.06
  See application file for complete search history.

(56) References Cited

U.S. PATENT DOCUMENTS

| 7,032,947 | B2 | 4/2006 | Queveau et al. |
| 7,367,607 | B2 * | 5/2008 | Roeder .................... B60J 7/203 296/107.08 |
| 2017/0129317 | A1 * | 5/2017 | Kronschnabl ............ B60J 7/203 |

FOREIGN PATENT DOCUMENTS

| DE | 19712967 A1 | 10/1998 |
| DE | 102007005639 A1 | 8/2008 |
| DE | 102007060362 A1 | 6/2009 |
| DE | 102010011566 B4 | 8/2015 |
| DE | 102017211322 A1 | 1/2019 |

* cited by examiner

*Primary Examiner* — Joseph D. Pape
(74) *Attorney, Agent, or Firm* — Fitch, Even, Tabin & Flannery, LLP

(57) ABSTRACT

A linkage flap arrangement of a convertible vehicle is provided, having a blind arrangement that may have a first blind and a second blind that can be driven using a common drive. The first blind, upon an actuation of the common drive, performs a pivoting movement between a covering position and a cleared position and the second blind performs a translatory movement via a coupling between the first blind and the second blind.

9 Claims, 8 Drawing Sheets

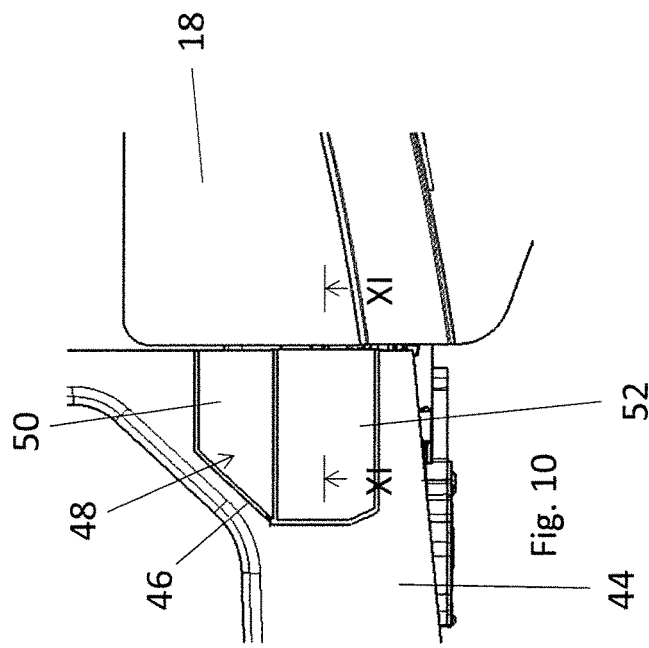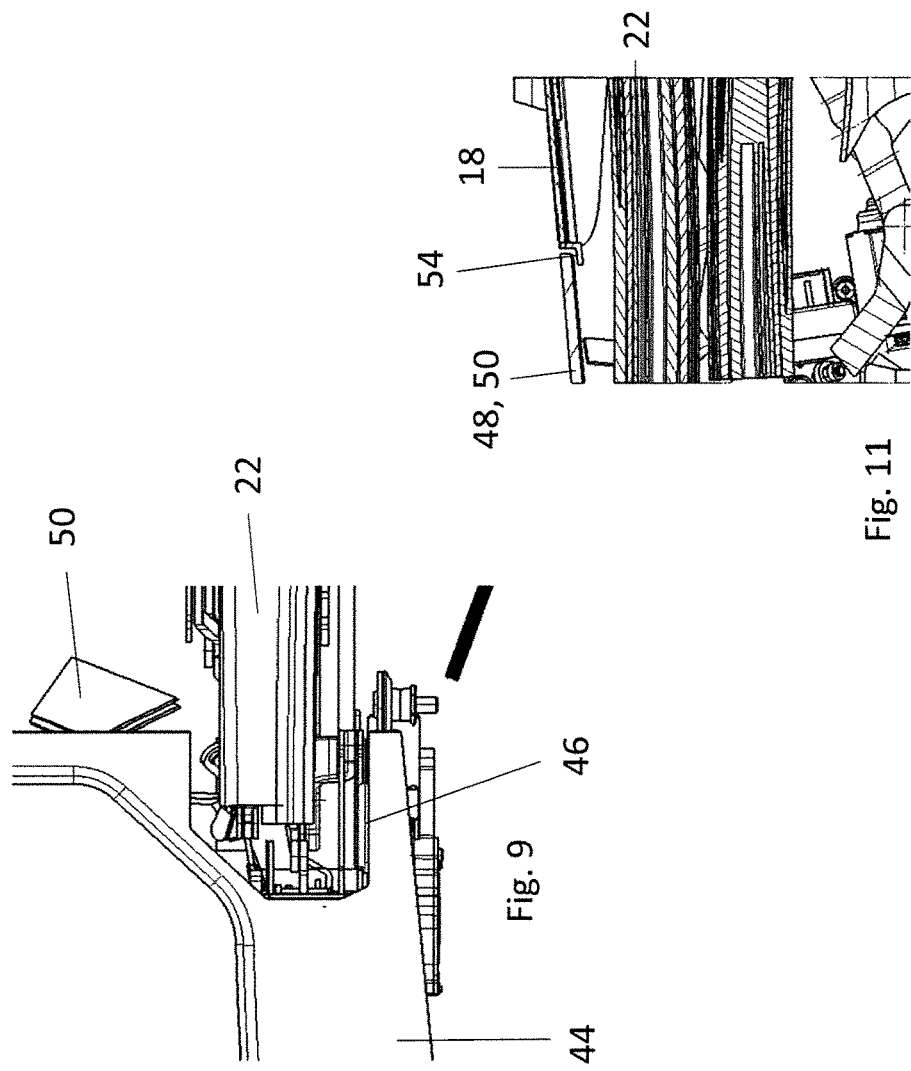

LINKAGE FLAP ARRANGEMENT AND CONVERTIBLE VEHICLE HAVING A LINKAGE FLAP ARRANGEMENT

CROSS-REFERENCE TO RELATED APPLICATION

This application claims priority from German Patent Application Number DE 10 2019 100 435.7, filed Jan. 9, 2019, which is hereby it herein by reference in its entirety for all purposes.

The invention relates to a linkage flap arrangement of a convertible vehicle having the features of the preamble of claim 1 as well as to a convertible vehicle having such a linkage flap arrangement.

A linkage flap arrangement of the type referred to in the introduction is known from practice and is part of a convertible vehicle that is provided with an adjustable top that can be shifted between a closed position, in which a vehicle interior is covered, and a storage position, in which the vehicle interior is cleared to the top. The top comprises a linkage that presents a link arrangement on each of its two sides in relation to a vertical longitudinal center plane of the top, said link arrangements, in the closed position of the top, reaching through a linkage opening that is disposed in the respective vehicle edge region. In the stored position of the top, in which the top is received by a rear top storage space together with the linkage, the linkage openings are each closed using blinds of a respective linkage flap arrangement. In the closed position, in which the link arrangements reach through the linkage openings, the blinds have to clear the linkage openings. For shifting the blinds between the covering position and the cleared position, drives may be provided. Additionally, several blinds may be assigned to each linkage opening, for covering different parts of the linkage opening. For example, one part is covered by a blind both in the stored position and in the closed position of the top, whereas this part has to be cleared during the shifting movement of the top.

It is the object of the invention to create a linkage flap arrangement that is realized in accordance with the type referred to in the introduction and with which two blinds for covering a linkage opening can be actuated in an optimized manner.

In accordance with the invention, this object is attained through the linkage flap arrangement having the features of claim 1.

In accordance with the invention, a linkage flap arrangement of a convertible vehicle is thus proposed that comprises two blinds that can be driven using a drive means and are coupled to each other via a coupling means in such a manner that a pivoting movement of one blind is converted into a translatory movement of the other blind. One blind can cover a portion of a linkage opening of the relevant vehicle both in the opened position and in the closed position of a linkage, only being transferred into a cleared position during the shifting movement of the top. The other blind covers a second portion of the linkage opening only in the stored position of the top. In the closed position of the top, in which a vehicle interior is covered, this portion of the linkage opening is cleared and the second blind is moved into a stowing position. The two blinds can be controlled in such a way that they are moved downwards when being shifted into a cleared or stowing position, consequently not exhibiting any surface exposed to the wind. This is in particular advantageous when a top is actuated during operation of the relevant vehicle, i.e. when the vehicle is moving.

Furthermore, by way of the coupling means, which converts the pivoting movement of the first blind into a translatory movement of the second blind, the motion sequence of the linkage flap arrangement can be performed harmonically.

In a special embodiment of the linkage flap arrangement according to the invention, the first blind is pretensioned in the direction of the storage position using a closing spring. Consequently, the drive means that is actuated using the blind arrangement consisting of the first blind and the second blind only has to act in one direction. A closing movement of the first blind is triggered automatically using the closing spring.

Correspondingly, in an advantageous embodiment of the linkage flap arrangement according to the invention, the second blind is pretensioned in the direction of its covering position using a return spring. The second blind, too, consequently automatically assumes its covering position when being cleared correspondingly.

The coupling means of the linkage flap arrangement according to the invention may comprise at least one coupling link that interacts with a drive link arrangement for the second blind. The coupling link is preferably connected to the first blind or to a support of the first blind and may present ball heads so that a pivoting movement of the first blind may also be effected about an axis that is inclined as compared to a longitudinal vertical plane of the relevant vehicle, i.e. assumes an angle that is smaller than 90°.

The drive link arrangement may comprise a thrust link that interacts, via a driver, with a link unit that is articulated to a slider of the second blind. Consequently, it is possible for the second blind to assume its cleared or stowing position or to be retained in the same, whereas the first blind is pivoted into a covering position, the thrust link then performing a free travel as compared to the link unit.

Preferably, the slider, to which the link unit is articulated for driving the second blind, is guided in a rail that is fixed relative to the car body.

For example, the drive means comprises a Bowden cable that is connected to a support of the first blind that is borne so as to be pivotable. Using the Bowden cable, only a tractive force can be exerted onto the support. The tractive force preferably acts in the direction of the cleared position. When loosening the Bowden cable, the support, and consequently the first blind, is pivoted back into the covering position using the closing spring.

The Bowden cable is preferably driven by a drive that is present at the convertible vehicle in any case. For example, said drive is a drive of a top compartment cover that is moved into an open position when the top is being shifted.

Subject of the invention is also a convertible vehicle that presents a top having a linkage and linkage openings that can each be covered using a linkage flap arrangement of the manner that has previously been described.

Further advantages and advantageous configurations of the subject-matter of the invention can be taken from the drawing, from the description and from the claims.

In the drawing, an exemplary embodiment of a linkage flap arrangement according to the invention is illustrated in a schematically simplified manner and will be explained in more detail in the following description.

Figure 3:
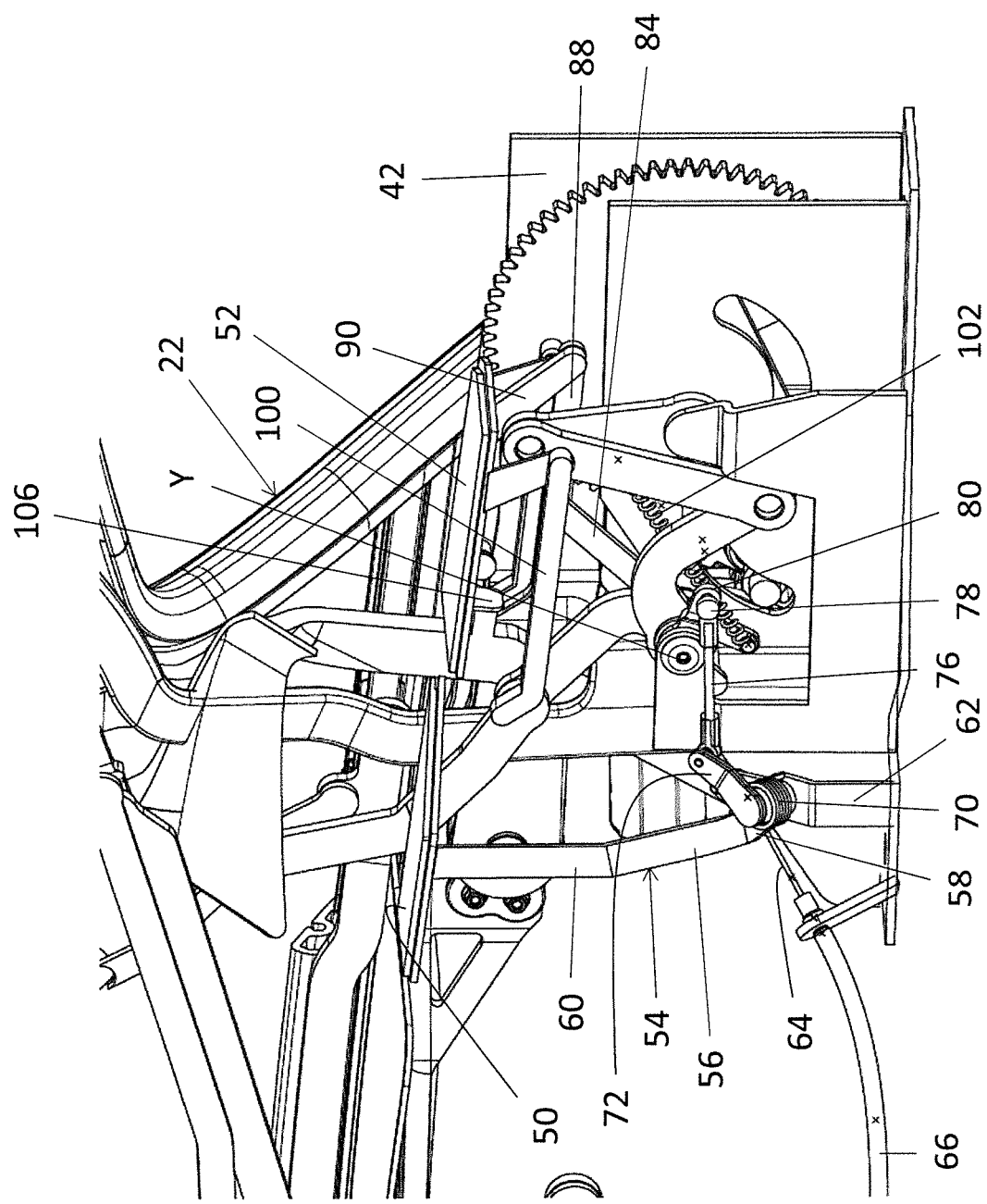
FIG. 3 shows an inside view of the linkage and of a linkage flap arrangement of the top arrangement in the region of a top main bearing in the closed position of the top.
Figure 5:
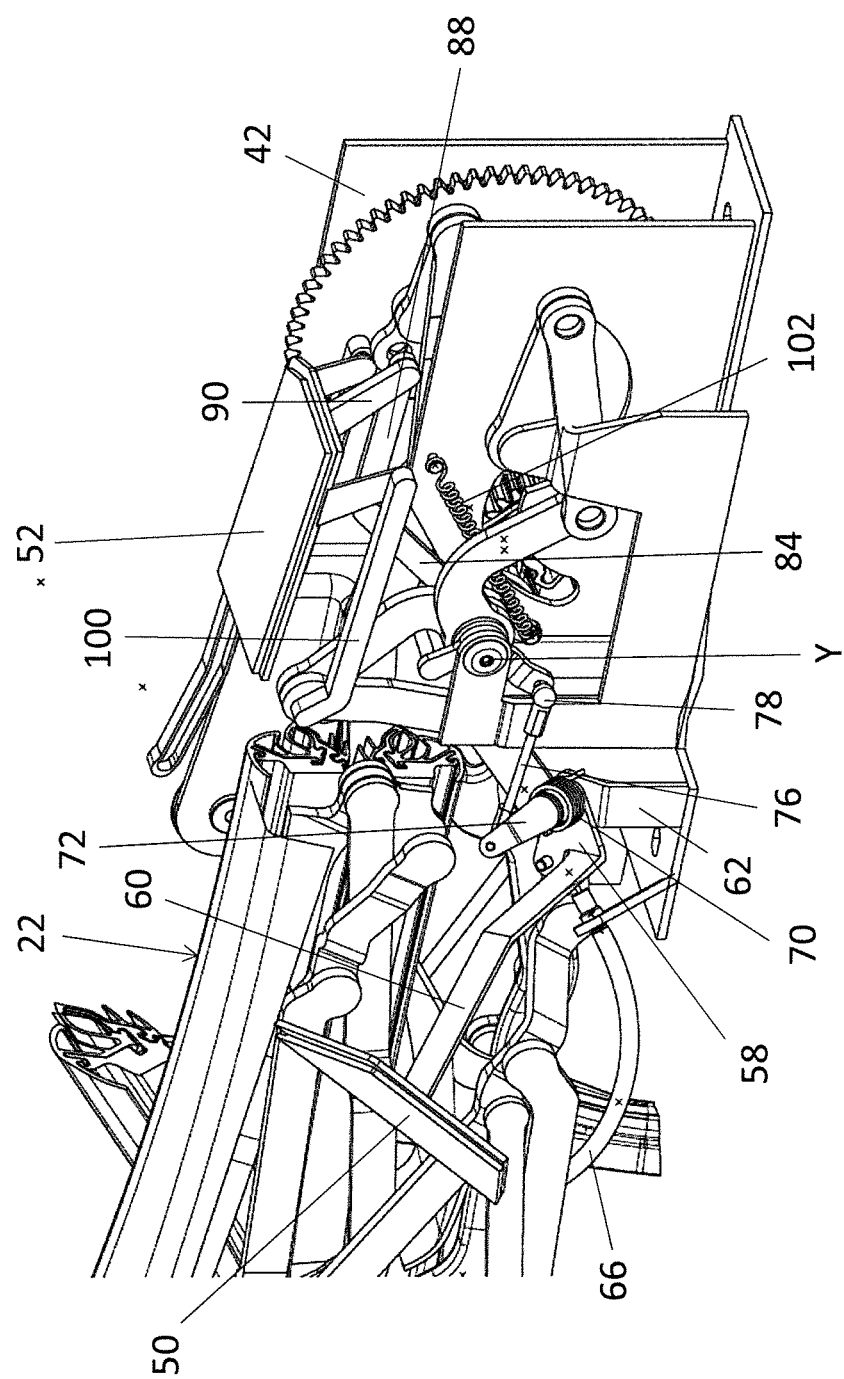
Figure 6:
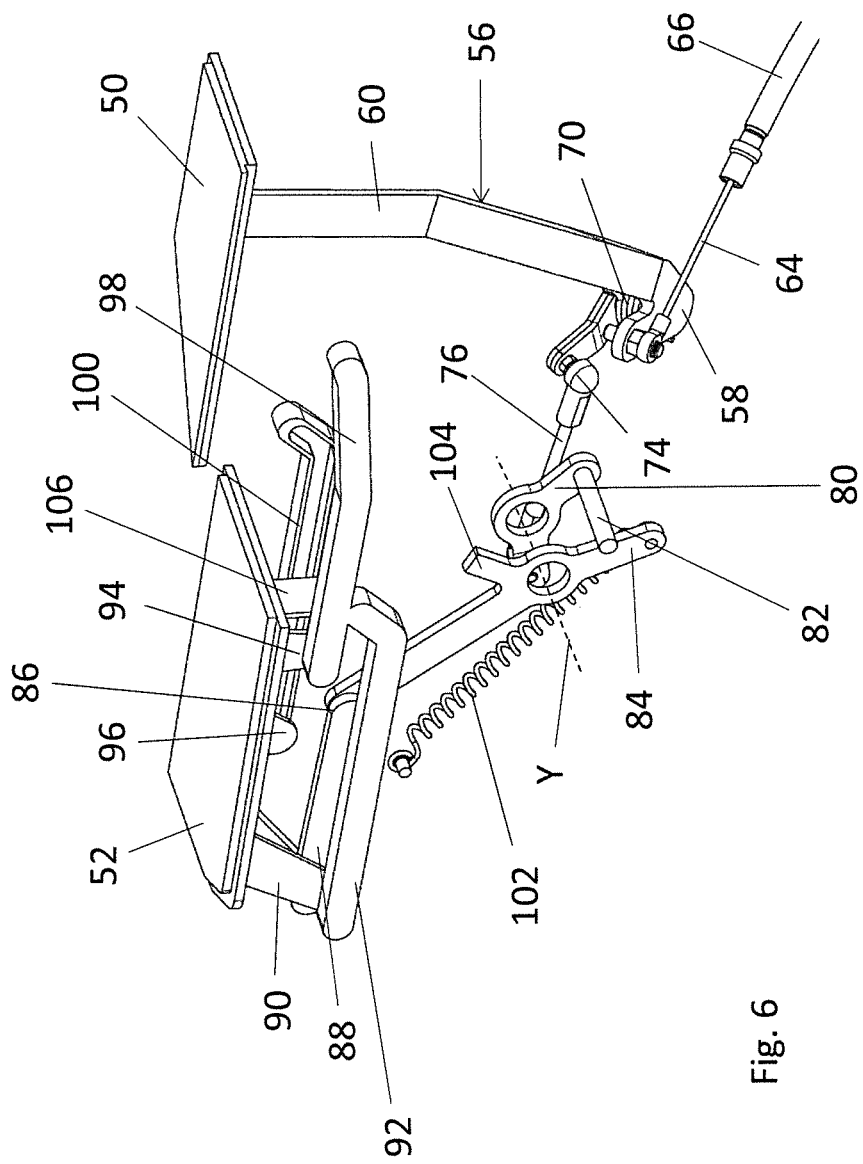
Figure 7:
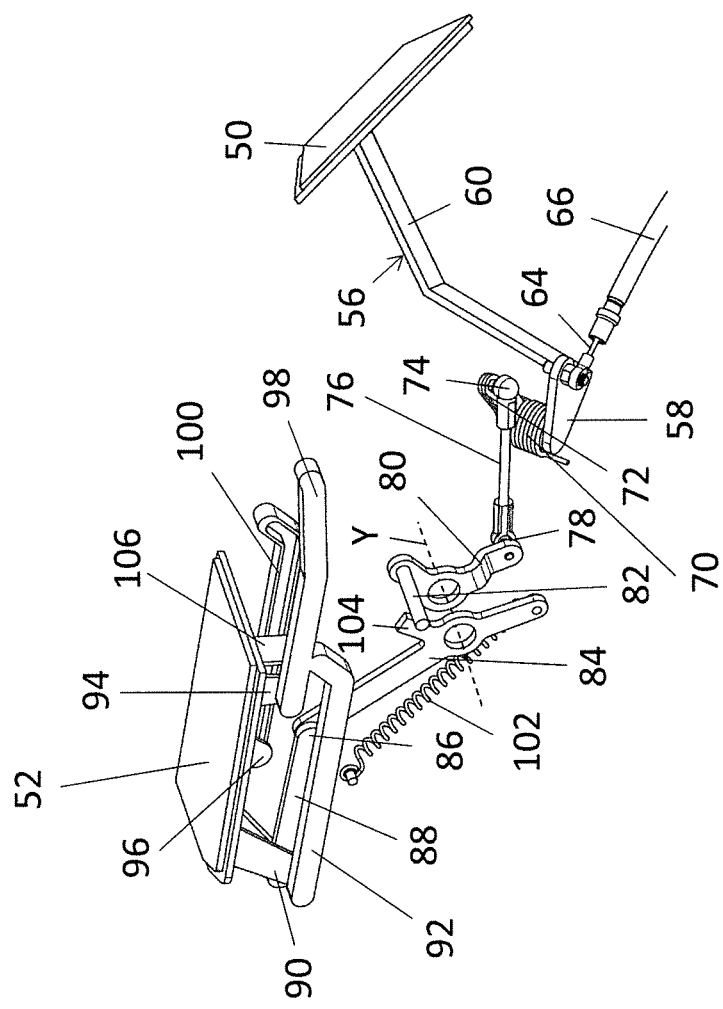
Figure 8:
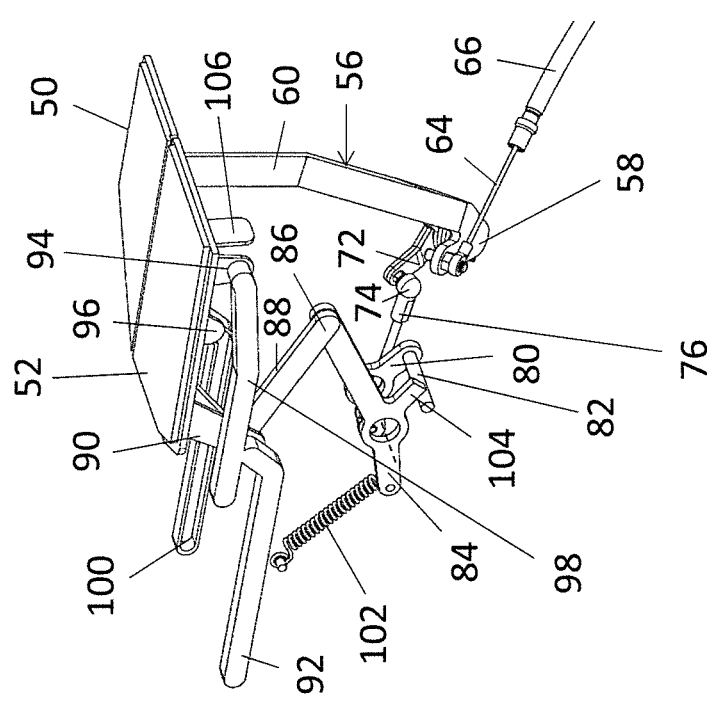

FIG. 5 also shows a view that corresponds to FIG. 3, but for a storage position of the top in the open position of the top compartment cover;

FIG. 6 shows the linkage flap arrangement on its own for the closed position of the top when the top compartment cover is closed;

FIG. 7 shows a view of the linkage arrangement that corresponds to FIG. 6, but for the open position of the top compartment cover;

FIG. 8 also shows a view that corresponds to FIG. 6, but for a storage position of the top and for the closed position of the top compartment cover;

FIG. 9 shows a view from above onto a linkage opening in the storage position of the top when the top compartment cover is open;

FIG. 10 shows a view that corresponds to FIG. 9, but with a closed top compartment cover; and FIG. 11 shows a longitudinal section through the arrangement according to FIG. 10 along line XI-XI.

In the drawing, a top arrangement 10 of a convertible vehicle, which is not illustrated in more detail otherwise, is illustrated, presenting a folding top 12 that can be shifted between a closed position or a closed-top position, in which a vehicle interior 14 is covered, and a storage position, in which the vehicle interior 14 is cleared to the top. In the storage position, the folding top 12 is received by a rear top storage space 16 of the vehicle, which top storage space can be closed using an adjustable top compartment cover 18.

The folding top 12 comprises a linkage 20 that comprises a link arrangement 22 on each of its two sides in relation to a vertical longitudinal center plane of the top, said link arrangement being borne so as to be pivotable at a respective main bearing 24 that is fixed relative to the vehicle or to the car body. A front bow 26, several transverse bows 28 as well as a rear tensioning bracket 30 extend between the link arrangements 22 that are disposed on each of the two sides, said rear tensioning bracket forming the rear edge of the top in the closed position that is illustrated in FIG. 1.

Additionally, a rear window 32, via rear window links, is borne at the link arrangements 22 that are disposed on each of the two sides. The linkage 20 serves to span a top cloth 34 that is produced from a foldable weatherproof material.

The linkage 20 or the two link arrangements 22 of the linkage 20 can each be actuated using an electric motor 42 and be shifted between the closed-top position and the storage position.

Figure 1:
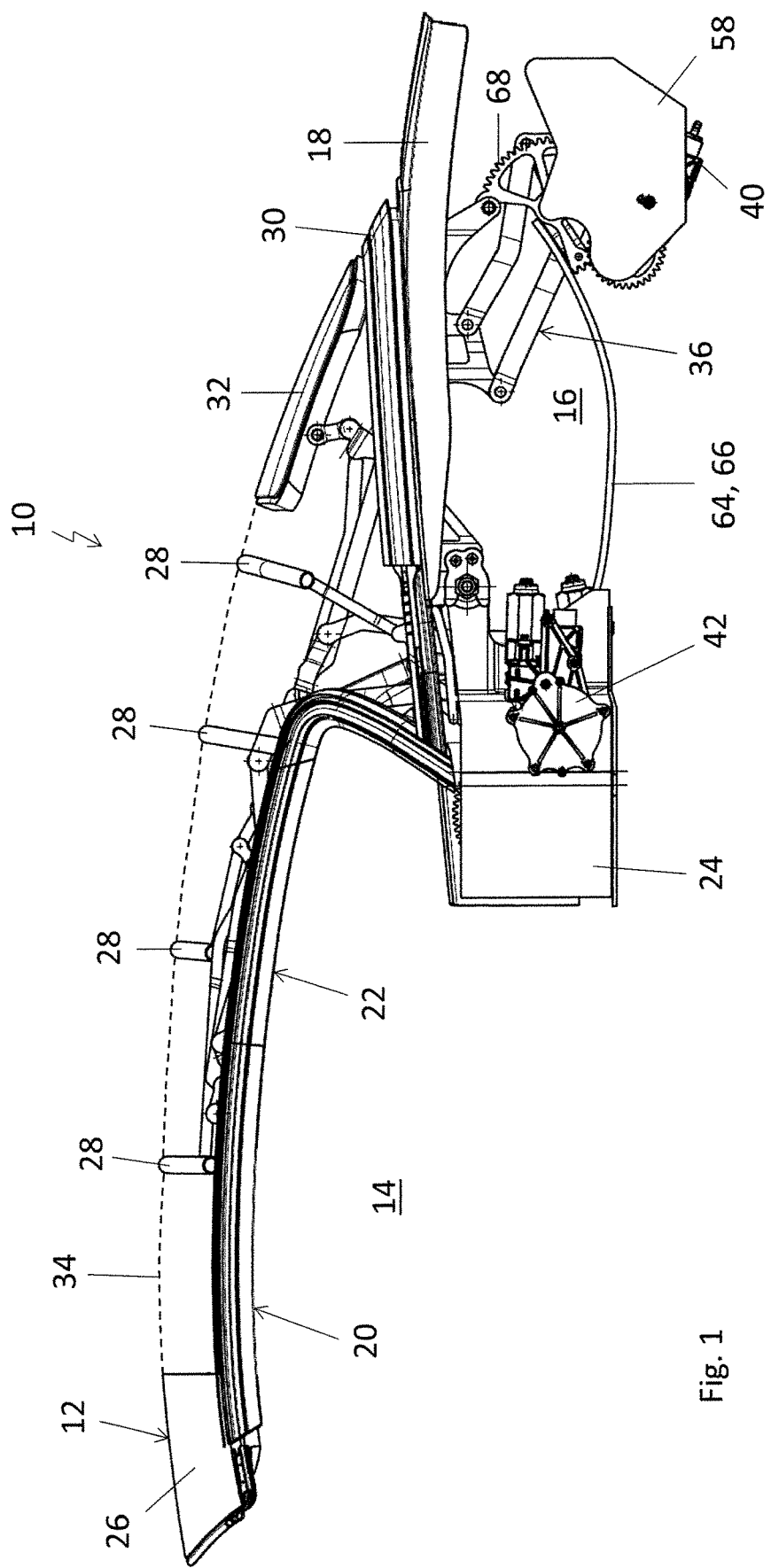
FIG. 1 shows a top arrangement of a convertible vehicle in a closed position.
Figure 2:
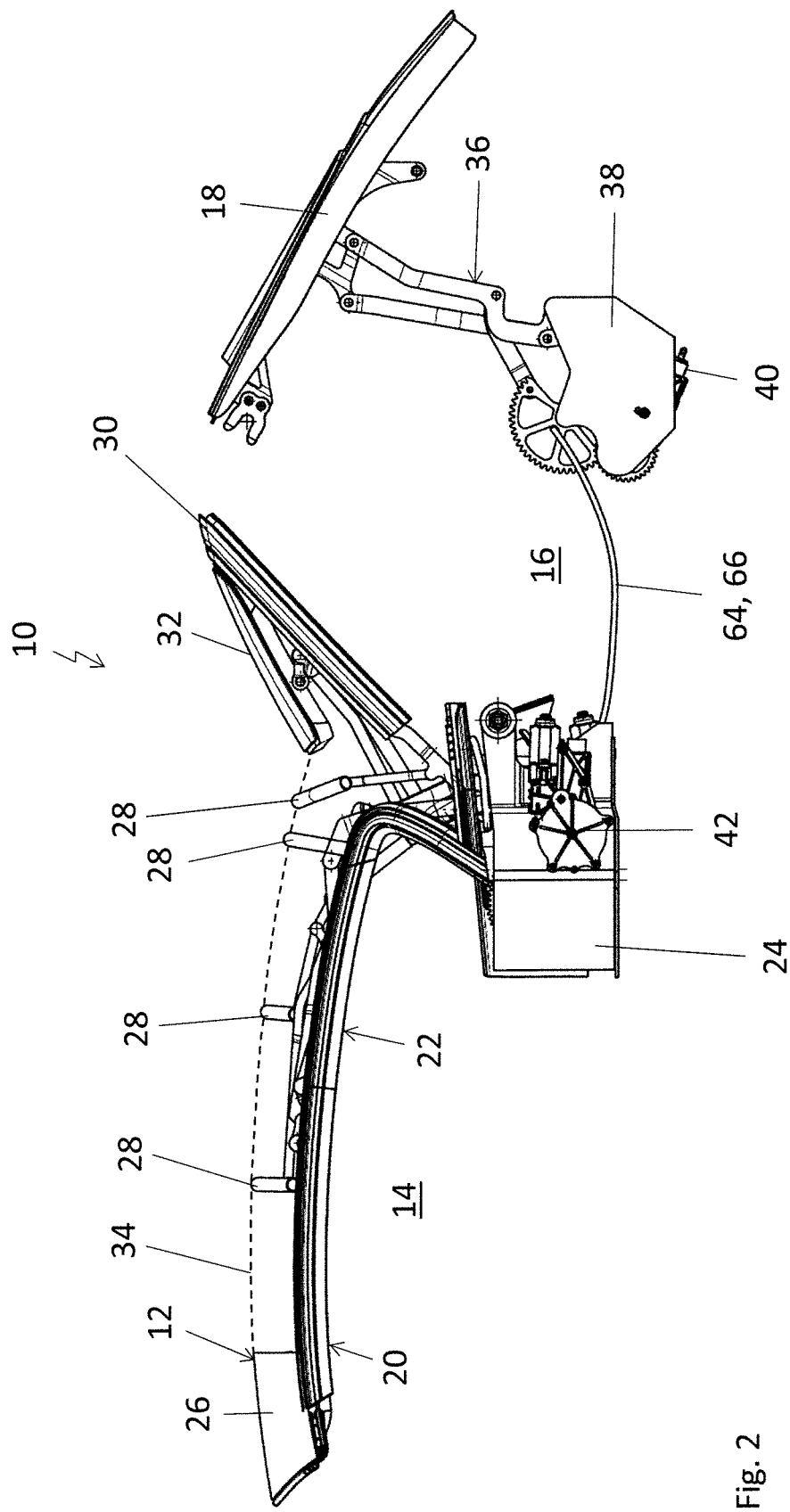
FIG. 2 shows a view of the top arrangement that corresponds to FIG. 1, but in an open position of a top compartment cover.

The top compartment cover 18 is borne at a link arrangement 36 on each of its two sides in relation to the vertical longitudinal center plane of the top, said link arrangements being borne so as to be pivotable at a bearing 38 that is fixed relative to the car body and being configured to be actuated using a drive motor 40 so that the top compartment cover 18 can be shifted between the closed position illustrated in FIG. 1 and the cleared position illustrated in FIG. 2.

In order to make it possible that the link arrangements 22 protrude from the top storage space 16, at the upper side of a vehicle paneling 44, in a region that abuts upon the top compartment cover 18, a linkage opening 46 is realized on each of the two sides in relation to the vertical longitudinal center plane of the top, said linkage opening being configured to be closed, in the storage position of the top, using a blind arrangement 48 that comprises two blinds 50 and 52.

As it can be taken from FIG. 11, the top compartment cover 18, in its closed position, reaches under the blind arrangement 48 with a lip 54 that is realized at the front edge.

The blind arrangements 48 are each part of a linkage flap arrangement 54 for the respective link arrangement 22. The linkage flap arrangements 54 that are disposed on each of the two sides are, like the link arrangements 22 of the linkage 20 that are disposed on each of the two sides, realized in a mirror-symmetrical fashion with respect to each other, which is why, in the following description, reference is only made to the linkage flap arrangement that is disposed on the left in relation to the forward direction of travel of the relevant vehicle. The linkage flap arrangement that is disposed on the right in relation to the forward direction of travel of the vehicle is realized in a mirror-symmetrical fashion so that its construction inevitably results along the same lines.

The linkage flap arrangements 54, for the blind 50 that is disposed inside in relation to the vertical longitudinal center plane of the top, in each instance present a blind support 56 that has a support pedestal 58 and a support rod 60. The support pedestal 58 is borne so as to be pivotable at a support bearing 62 that is realized at the main bearing 24 in a fashion fixed relative to the car body, namely about an axis that points backwards and diagonally to the outside in relation to the orientation of the vehicle.

Consequently, the blind 50, upon a pivoting of the blind support 56, also performs a pivoting movement about said axis that is oblique in the vehicle.

A pull cable 64 is linked to the support pedestal 58 of the blind support 56, said pull cable being part of a Bowden cable and being guided, in a Bowden cable guide 66, towards a drive wheel 68 that is a part of the drive for the top compartment cover 18 and is driven by the drive motor 40. Consequently, the linkage flap arrangement 54 is driven using the drive means for the top compartment cover 18.

Figure 4:
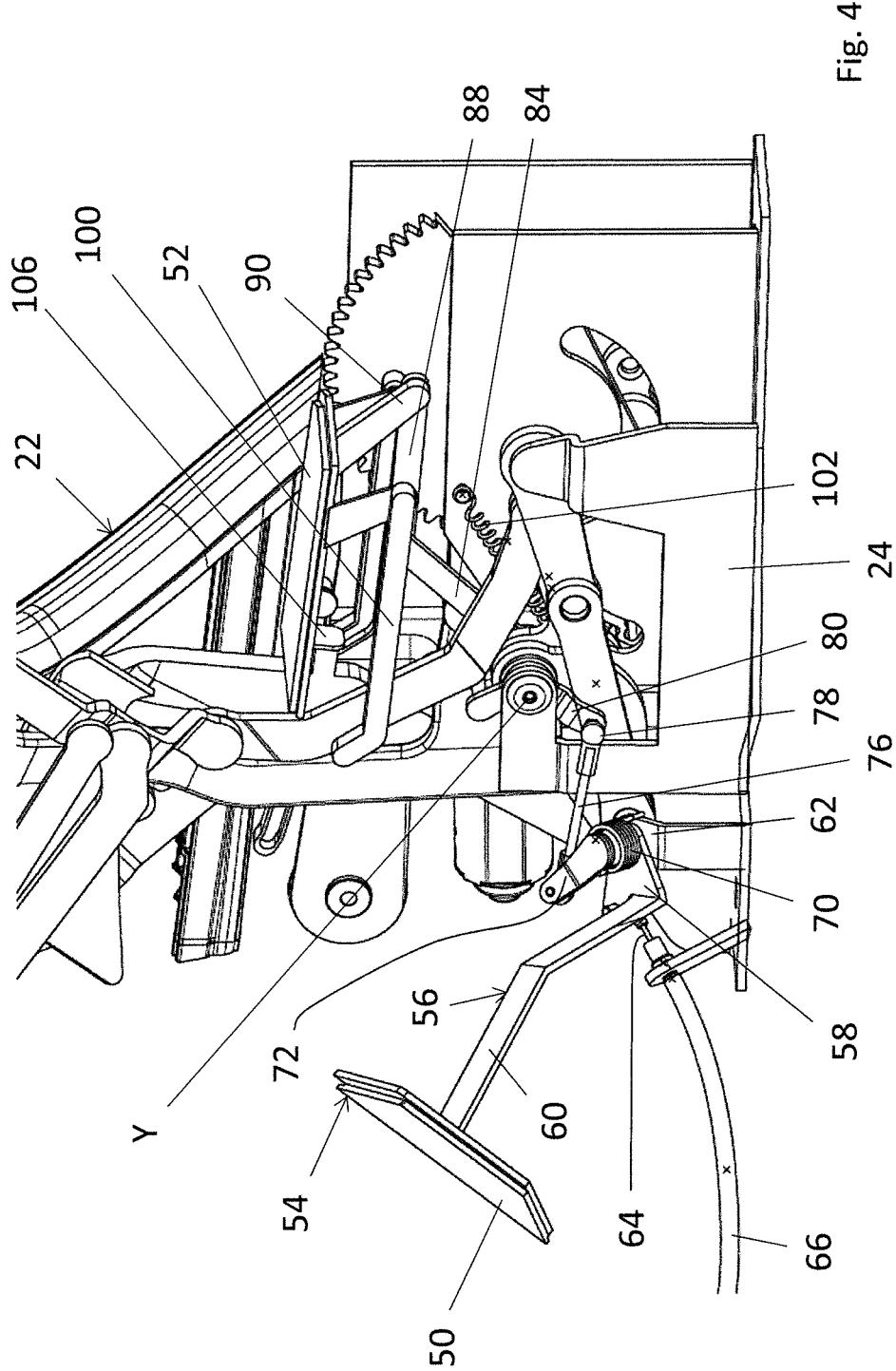
FIG. 4 shows a view that corresponds to FIG. 3, but for the open position of the top compartment cover.

The blind 50 can be shifted, using the blind support 56, between a covering position that is illustrated in FIG. 3 and a cleared position that is illustrated in FIGS. 4 and 5. The cleared position is realized by actuating the pull cable 64 using the drive for the top compartment cover 18. The blind 50 is shifted from the cleared position into the covering position using a closing spring 70 that pretensions the blind support 56 and consequently the blind 50 in the direction of its covering position. When the pull cable 64 is cleared, the blind 50, owing to the spring force of the closing spring 70, is thus automatically returned into the covering position, in which the blind opening 48 is partially covered.

In order to be able to realize an actuation or a shifting of the blind 52 also using the drive of the top compartment cover 18, a coupling means is provided between blind 50 and blind 52. The coupling means comprises an adjusting lever 72 that is connected to the support pedestal 58 in a rotationally fixed fashion and whose pivot axis is the same as the pivot axis of the blind support 56. A coupling link 76 is articulated to the adjusting lever 72 via a ball-and-socket joint 74, said coupling link interacting with a drive link arrangement for the blind 52, hereunto being connected, via a ball-and-socket joint 78, to a thrust link 80 of the drive link arrangement, said thrust link being pivotable about an axis Y. At the thrust link 80, a driver 82 is realized at the end region that faces away from the ball-and-socket joint 78, said driver acting on a link 84 that is also pivotable about the axis Y and is connected, in an upper end region, via a hinge 86, to another link 88 that is articulated to a slider 90 at its end that faces away from the hinge 86, said slider being part of a support of the blind 52. The slider 90 is guided in an outer rail 92 that is fixed relative to the vehicle. Additionally, the support for the blind 52 comprises two other sliders 94 and 96 that are guided in rails 98 and 100 that are fixed relative to the car body.

The link 84 of the link unit that consists of the two links 84 and 88, at its end that faces away from the hinge 86, is connected to a return spring 102 that pretensions the blind 52 in the direction of its covering position that is illustrated in FIG. 8.

The linkage flap arrangement 54 that has previously been described in the drawing works in the manner that is described in the following.

Starting from the covering position of the two blinds 50 and 52 that is illustrated in FIG. 8, by opening the top compartment cover 18, using the drive motor 40, an adjusting force is exerted onto the blind support 56 by the cable pull 64, whereby said blind support is pivoted, together with the blind 50, about the pivot axis that is realized at the support bearing 62. The blind 50 is consequently moved into a cleared position. The pivoting movement is transmitted, via the adjusting lever 72, the coupling link 76, the thrust link 80 and the two links 84 and 88, onto the blind 52 so that it performs a translatory movement against the force of the return spring 102, being advanced into a cleared position or stowing position in the rails 92, 98 and 100, in the direction of the front of the vehicle. The top 12 or the linkage 20 can now be shifted into the closed position, in which the vehicle interior 14 is covered (cf. FIG. 7). If the top compartment cover is then shifted into its closed position again, the pull cable 64 is released, whereby the blind 50 is shifted into its covering position again owing to the spring force of the closing spring 70. The blind 52, in contrast, remains in its position since it abuts, via a stop 106, on the link arrangement 22, which reaches through the linkage opening 46. The return spring 102 consequently keeps being tensioned. When shifting the blind 50 from the cleared position into the covering position, the thrust link 80, the folding top 12 being closed, performs a free travel together with its driver 82 since it is not in contact with a corresponding driver projection 104 of the link 84.

If the folding top 12 is now supposed to be moved back into its storage position, the top compartment cover 18 is opened (cf. FIG. 2). Hereby, the blind 50 is pivoted into its cleared position using the pull cable 64 (cf. FIG. 7). As soon as the folding top 12 has been stored in the top storage space 16, the top compartment cover 18 can be closed again. By driving the drive motor 40 in a corresponding fashion, the pull cable 64 is released again, whereby the blind 50, by way of the spring force of the closing spring 70, is adjusted into its covering position. Simultaneously, the blind 52, by way of the spring force of the return spring 102 that acts on the link 84, can translatorily be shifted in the rails 92, 98 and 100, towards the rear, into its covering position, the driver 82 staying in contact with the driver projection 104 of the link 84 (cf. FIGS. 8 and 10).

REFERENCE NUMERALS

10 top arrangement
12 folding top
14 vehicle interior
16 top storage space
18 top compartment cover
20 linkage
22 link arrangement
24 main bearing
26 front bow
28 transverse bow
30 tensioning bracket
32 rear window
34 top cloth
36 link arrangement
38 bearing
40 drive motor
42 electric motor
44 vehicle paneling
46 linkage opening
48 blind arrangement
50 blind
52 blind
54 linkage flap arrangement
56 blind support
58 support pedestal
60 support rod
62 support bearing
64 pull cable
66 Bowden cable guide
68 drive wheel
70 closing spring
72 adjusting lever
74 ball-and-socket joint
76 coupling link
78 ball-and-socket joint
80 thrust link
82 driver
84 link
86 hinge
88 link
90 slider
92 rail
94 slider
96 slider
98 rail
100 rail
102 return spring
104 driver projection
106 stop

The invention claimed is:

1. A linkage flap arrangement of a convertible vehicle, comprising: a blind arrangement having a first blind and a second blind that can be driven using a common drive, wherein the first blind, upon an actuation of the common drive, performs a pivoting movement between a covering position and a cleared position, and wherein the second blind performs a translatory movement via a coupling between the first blind and the second blind;

wherein the coupling comprises at least one coupling link that interacts with a drive link arrangement for the second blind.

2. A linkage flap arrangement of a convertible vehicle, comprising: a blind arrangement having a first blind and a second blind that can be driven using a common drive, wherein the first blind, upon an actuation of the common drive, performs a pivoting movement between a covering position and a cleared position, and wherein the second blind performs a translatory movement via a coupling between the first blind and the second blind, wherein the first blind is pretensioned in a direction of the covering position using a closing spring.

3. A linkage flap arrangement of a convertible vehicle, comprising: a blind arrangement having a first blind and a second blind that can be driven using a common drive, wherein the first blind, upon an actuation of the common drive, performs a pivoting movement between a covering position and a cleared position, and wherein the second blind performs a translatory movement via a coupling between the first blind and the second blind, wherein the second blind is pretensioned in a direction of its covering position using a return spring.

4. The linkage flap arrangement according to claim 1, wherein the drive link arrangement comprises a thrust link that interacts, via a driver, with a link unit that is articulated to a slider of the second blind.

5. The linkage flap arrangement according to claim 4, wherein the slider is guided in a rail that is fixed relative to the convertible vehicle body.

6. The linkage flap arrangement according to claim 1, wherein the first blind can be pivoted about an axis that points diagonally backwards and downwards in relation to an orientation of the vehicle.

7. A linkage flap arrangement of a convertible vehicle, comprising: a blind arrangement having a first blind and a second blind that can be driven using a common drive, wherein the first blind, upon an actuation of the common drive, performs a pivoting movement between a covering position and a cleared position, and wherein the second blind performs a translatory movement via a coupling between the first blind and the second blind, wherein the common drive means comprises a cable pull connected to a support of the first blind that is borne so as to be pivotable.

8. The linkage flap arrangement according to claim 7, wherein the cable pull is driven by a drive of a top compartment cover.

9. A convertible vehicle, comprising a top having a linkage and linkage openings that can each be closed using a linkage flap arrangement according to claim 1.

* * * * *